United States Patent [19]
Yabusa et al.

[11] Patent Number: 5,498,385
[45] Date of Patent: Mar. 12, 1996

[54] METHOD FOR THE MANUFACTURE OF A COMPOSITE LAMINATE

[75] Inventors: Kazuya Yabusa; Takeo Kato; Tetsuo Aizawa; Masayuki Taniguchi, all of Tokyo, Japan

[73] Assignee: Toppan Printing Co., Ltd., Tokyo, Japan

[21] Appl. No.: 329,337

[22] Filed: Oct. 26, 1994

Related U.S. Application Data

[62] Division of Ser. No. 950,495, Sep. 25, 1992, Pat. No. 5,409,772.

[30] Foreign Application Priority Data

Sep. 27, 1991 [JP] Japan .................. 3-249106
Jul. 2, 1992 [JP] Japan .................. 4-197463

[51] Int. Cl.⁶ .................................................. B29C 47/02
[52] U.S. Cl. .................. 264/171.23; 428/335; 428/480; 428/481; 428/535; 428/536; 156/344
[58] Field of Search .................................. 428/480, 335, 428/481, 535, 536, 532.5; 156/344; 264/211.2, 334, 291, 177.17, 171

[56] References Cited

U.S. PATENT DOCUMENTS

| | | | |
|---|---|---|---|
| 4,427,614 | 1/1984 | Barham et al. | 428/913.3 |
| 4,503,098 | 3/1985 | Potts | 427/394 |
| 4,521,467 | 6/1985 | Berger | 428/483 |
| 4,603,070 | 7/1986 | Steel et al. | 428/481 |
| 5,124,371 | 6/1992 | Tokiwa et al. | 523/124 |
| 5,171,309 | 12/1992 | Gallagher et al. | 428/481 |

FOREIGN PATENT DOCUMENTS

| | | |
|---|---|---|
| 0142950 | 5/1985 | European Pat. Off. . |
| 0226439 | 6/1987 | European Pat. Off. . |
| 2231027 | 7/1990 | United Kingdom . |

*Primary Examiner*—P. C. Sluby
*Attorney, Agent, or Firm*—Staas & Halsey

[57] ABSTRACT

A biodegradable composite laminate for the manufacture of packaging containers is provided. The composite laminate includes a straight-chain, biodegradable 3-hydroxybutyric acid/3-hydroxyvaleric acid copolyester in a thin film which has been laminated on at least one surface of a sheet-like substrate. A polymeric blend of a poly-ε-caprolactone with the straight-chain copolyester may be employed in the place of the straight-chain copolyester alone. The method for the manufacture thereof is also provided.

14 Claims, 2 Drawing Sheets

METHOD FOR THE MANUFACTURE OF A COMPOSITE LAMINATE

This application is a divisional of prior application Ser. No. 07/950,495, filed Sep. 25, 1992, now U.S. Pat. No. 5,409,772.

BACKGROUND OF THE INVENTION

(1) Field of the Invention

The present invention relates to a composite laminate for the manufacture of laminated stock materials used for packaging food, and paper cartons used for food trays, liquid cartons, paper cups, and the like. More particularly, it relates to a composite laminate comprising a biodegradable resin, and a method for the manufacture thereof. The items made from the composite laminate of the present invention are capable of being broken down by environmental action to which the items become subject as litter.

(2) Description of the Prior Art

Many stock materials and containers made from paper, paperboard, a plastic film, or a nonwoven plastic fabric used as substrate are used for a wide variety of applications.

These stock materials and containers, when made solely from a natural material such as paper, paperboard, cellophane and the like, do not perform well for functions such as watertightening, hygiene-retaining and heat-sealing of the contents; therefore, a multiple composite laminate is widely used for the manufacture of laminated stock materials and paper cartons. In this case, the natural material is used jointly with a plastic material, in particular a polyolefins such as polyethylenes and polypropylenes which are used as a sealant or coating layer of the multiple composite laminate to thereby create or reinforce the aforesaid functions.

Many items such as stock materials and containers are used as 'one-trip' packaging materials and are destined, after a relatively short functional life, to arrive as a significant component of urban garbage. The amount of packaging materials as a component of urban garbage increases with an increase in the production of these items, and thereby the amount of such garbage is reaching the maximum capacity of garbage disposal facilities. On the other hand, there are not enough garbage disposal facilities in the planning stage and thereby such components of waste or garbage constitute a mounting nuisance.

These bags and containers are made from a multiple composite laminate; even so, it has been proposed that they should be capable of being easily recycled after use or should be capable of being broken down biologically, i.e. should be biodegradable.

One of the major problems encountered with the recycling system is the difficulty in separating the composite into individual layers; therefore, the recycling system for stock materials and containers made from a multiple composite laminate has not been established.

Under such circumstances, biodegradable plastic materials have been developed. These materials are capable of undergoing degradation by the action of micro-organisms of the environment when they form a component of garbage disposed in a reclaimed land. Among them, straight-chain copolyesters of 3-hydroxybutyric acid and 3-hydroxyvaleric acid (hereinafter also referred to as "straight-chain 3-hydroxybutyric acid/3-hydroxyvaleric acid copolyester" or simply as "straight-chain copolyester") have functions comparable to those of conventional polyolefins such as polyethylenes and polypropylenes, for example, heat-sealing functions, in addition to biodegradability; therefore, the copolyesters of this kind are regarded as a promising substitute for materials used as sealant or coating layer.

For example, there is every reason to expect that a composite laminate comprising a natural type substrate, such as paper, paperboard, nonwoven rayon fabrics, cellophane films and the like, coated with the aforesaid straight-chain copolyester may be used for the manufacture of biodegradable stock materials and containers for food packaging purposes.

Generally, a co-extrusion coating technique is employed to laminate a substrate with a polyolefins such as polyethylenes and polypropylenes, from the standpoint of the costs of operation and processability.

The co-extrusion coating is carried out at high temperatures such as 290° to 320° C. Although straight-chain 3-hydroxybutyric acid/3-hydroxyvaleric acid copolyesters have a fairly good co-extrusion processability, they are liable to be subjected to thermal cracking at a temperature above 200° C. When the co-extrusion coating is carried out at a temperature of 180° to 190° C., the straight-chain polyester is stable, but a composite laminate having a sufficient laminating strength to paper cannot be obtained due to a shortage of heat supply. In addition, when a thin film of the straight-chain copolyester with a thickness less than 50 µm is desired, peripheral side areas (so-called "deckle edge") become too thick compared with those of polyethylenes and polypropylenes, resulting in an unstable operation.

In addition, although straight-chain 3-hydroxybutyric acid/3-hydroxyvaleric acid copolyesters, which are present in vivo as a product of metabolism of microorganisms, have a sufficient biodegradability, they are expensive materials.

Accordingly, it is an important factor in laminating the straight-chain copolyester that a minimum thin film can be laminated on a substrate in a stable state.

The applicant of the present invention has proposed a biodegradable composite laminate and a method for the manufacture thereof (Japanese Patent Publication No. 60-52950), the method comprising co-extrusion coating a thermoplastic elastomer and a peelable resin from the elastomer on a porous substrate, and thereafter stripping the peelable resin.

SUMMARY OF THE INVENTION

The principal object of this invention is to provide a biodegradable composite laminate having a sufficient laminating strength, and a method for the manufacture thereof, the method comprising coating a straight-chain 3-hydroxybutyric acid/3 hydroxyvaleric acid copolyester as an uniform and thin film on a substrate made from a natural material such as paper, paperboard, nonwoven rayon fabrics, cellophane films and the like.

According to the first aspect of the invention, there is provided a composite laminate comprising a straight-chain 3-hydroxybutyric acid/3-hydroxyvaleric acid copolyester as a thin film laminated on at least one side of a sheet-like substrate.

According to the second aspect of the invention, there is provided a method for the manufacture of a composite laminate in which the method comprises co-extrusion coating a straight-chain 3-hydroxybutyric acid/3-hydroxyvaleric acid copolyester layer as a thin film with a polyolefin layer on at least one side of a sheet-like substrate, laminate the copolyester layer on the substrate, and thereafter stripping the polyolefin layer.

According to the third aspect of the present invention, there is provided a composite laminate comprising a polymeric blend of a straight-chain 3-hydroxybutyric acid/3-hydroxyvaleric acid copolyester with a poly-ε-caprolactone as a thin film which has been laminated on at least one side of a sheet-like substrate in which the polymeric blend comprises 100 parts by weight of the straight-chain copolyester and 10 to 30 parts by weight of the poly-ε-caprolactone.

According to the fourth aspect of the present invention, there is provided a method for the manufacture of a composite laminate in which the method comprises co-extrusion coating a polymeric blend layer and a polyolefin on at least one side of a sheet-like substrate, laminating the co-extrusion coated polyolefin/polymeric blend lamination film on the substrate while facing the polymeric blend layer to the substrate's surface, and thereafter stripping the polyolefin layer.

The composite laminates according to the first and third aspect of the invention can be used for the manufacture of stock materials and packaging containers by means of cutting, pressing and heat sealing process. The straight-chain copolyester and polymeric blend layers of these items are capable of being broken down biologically when buried in the soil.

By means of the method according to the second aspect of the invention, a composite laminate of good quality can be obtained because of that, when the co-extrusion coating the straight-chain copolyester having a lower molding temperature with a polyolefin such as polyethylenes or polypropylenes on the substrate, and when laminating the co-extrusion coated polyolefin/copolyester lamination film on the substrate while facing the copolyester layer to the substrate' surface, excess heat of the polyester layer having a lower molding temperature can be readily absorbed by the adjacent polyolefin layer such as a polyethylene or polypropylene layer having a larger specific heat, thereby being laminated the polyester layer on the substrate without being subject to thermal cracking.

By means of the method according to the fourth aspect of the invention, a composite laminate of good quality can be obtained because of that, when co-extrusion coating the aforesaid polymeric blend layer with a polyolefin layer on at least one surface of the substrate, and when laminating the co-extrusion coated polyolefin/polymeric blend lamination film on the substrate while facing the polymeric blend layer to the substrate's surface, an excess heat of the polymeric blend layer having a lower molding temperature can be readily absorbed by the adjacent polyolefin layer such as a polyethylene or polypropylene layer having a larger specific heat, thereby laminating the polymeric blend layer on the substrate without being subject to thermal cracking.

DETAILED DESCRIPTION OF THE PREFERRED EMBODIMENTS

Figure 1:
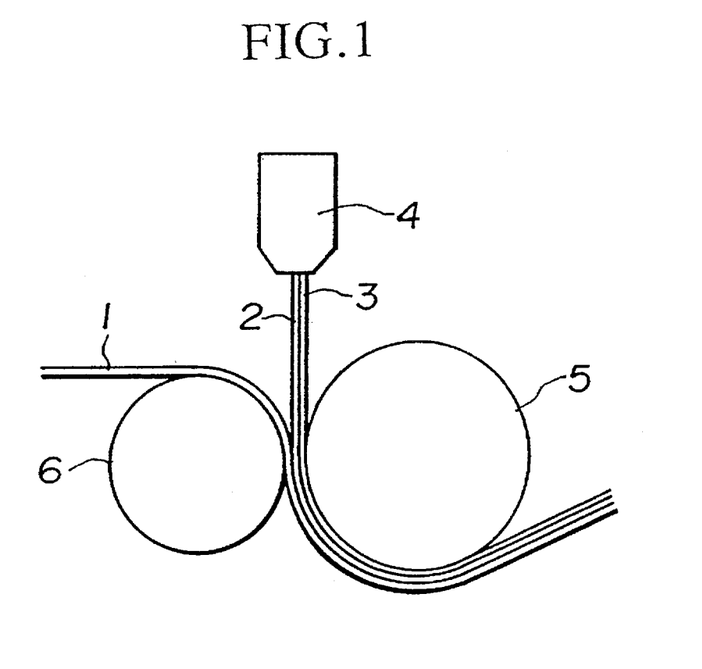
FIG. 1 is a section illustrating the co-extrusion method for the manufacture of a composite laminate according to the second aspect of the present invention.
Figure 2:
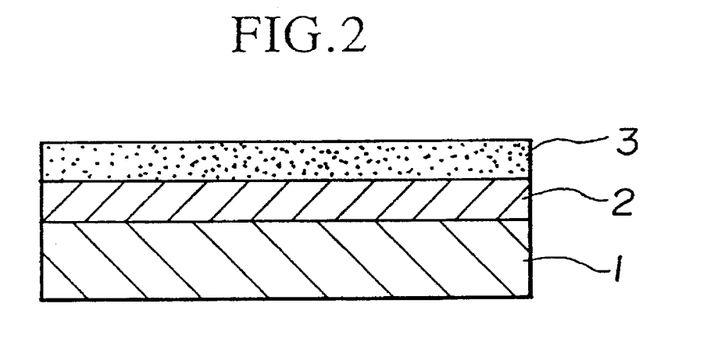
FIG. 2 is a sectional view showing a co-extruded polyolefin/copolyester lamination film which has been laminated on a substrate.
Figure 3:
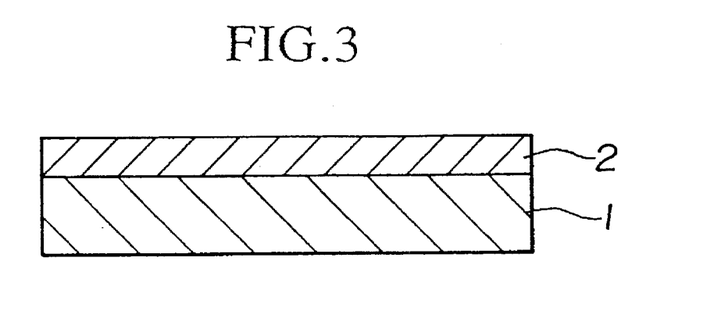
FIG. 3 is a sectional view showing a composite laminate according to the first aspect of the invention, obtained by stripping the polyolefin layer from the co-extrusion coated polyolefin/copolyester lamination film in FIG. 2.

In FIG. 1 to FIG. 3 are shown a preferred composite laminate according to the first aspect of the invention, and a method for the manufacture thereof according to the second aspect of the invention.

As is illustrated in FIG. 1, a straight-chain 3-hydroxybutyric acid/3-hydroxyvaleric acid copolyester 2 and a polyolefin 3 are co-extruded through a T-die 4, and co-extrusion coating the co-extruded lamination film (2 and 3) so as to laminate the copolyester 2 on a sheet-like substrate 1 made from paper and the like, by means of cast rolls 5 and nip rolls 6.

In FIG. 2 is shown an enlarged fragmentary sectional view of the co-extrusion coated polyolefin 3/copolyester 2 lamination film on the substrate 1. The polyolefin layer 3 adheres to the copolyester layer 2 with pseudo-adhesion forces; therefore, by stripping the polyolefin layer 3, a preferred composite laminate (FIG. 3) of the present invention can be obtained.

One of the greatest characteristics of the invention (FIGS. 1 to 3) is that a thin copolyester layer with an uniform thickness can be obtained by co-extrusion of the straight-chain copolyester 2 with the polyolefin 3, whereas, when the copolyester alone is extrusion coated on the substrate at a much lower temperature than 200° C. at which the polyester is not susceptible to thermal cracking, a composite laminate having a sufficient laminating strength and an uniform thickness cannot be obtained.

In addition, a composite laminate having a sufficient laminating strength can be obtained by the co-extrusion due to the absorption of excess heat of the copolyester layer by the adjacent polyolefin having a larger specific heat. Examples of the polyolefins employed herein include polyethylenes and polypropylenes which are reasonable in prices and good in processability.

When co-extruded with the aforesaid polyester at a temperature of 180° to 190° C., the polyolefin should have a melt flow rate of 10 g/10 min or more, preferably 15 to 50 g/10 min in order to attain a stable processability in a thin film.

Examples of the substrates employed herein include natural materials such as paper, paperboard, nonwoven rayon fabrics, cellophane films and the like. The stretching films made from the straight-chain 3-hydroxybutyric/3-hydroxyvaleric acid copolyester may be also employed. These materials are of biodegradable in nature. The quality and thickness of the substrate depends on the purpose.

From the viewpoint of processability in co-extrusion, the preferred straight-chain copolyester contains 1 to 20% by weight of 3-hydroxyvaleric acid moieties in the molecule. A multi-layer T-die extrusion lamination machine is employed in the present invention (FIGS. 1 to 3); however, any multi-layer co-extrusion lamination techniques such as a multi-manifold co-extrusion, feed block technique, and the like may be employed.

The thickness of the co-extruded copolyester layer is 1 to 50 µm according to the purpose. The thickness ratio of the polyester layer to polyolefin layer is 100:50 or more, preferably 100:100 or more. In this case, by taking advantage of the flow of the polyolefin, a polyester layer with an uniform thickness in width direction can be obtained.

The total thickness of the co-extruded polyolefin/copolyester lamination film is at least 10 µm or more, preferably 15 µm or more. When the total thickness is less than 10 µm, a sufficient laminating strength with the substrate can not be obtained.

The co-extrusion temperature is 200° C. or lower, preferably 180° to 190° C. depending on the susceptibility of the straight-chain copolyester layer to thermal cracking.

Stripping of the polyolefin layer from the copolyester layer which has been laminated on the substrate may be carried out at any time after the lamination has well completed. However, it is most efficient to carry out the stripping in-line after the trimming of so-called "deckel edge" by means of a cutter. The polyolefin thus stripped may be recycled for reuse after crushing.

The composite laminates according to the present invention (FIGS. 1 to 3) are used for the manufacture of packaging bags, stock materials and containers such as trays, liquid cartons, paper cups, and the like by means of cutting, press forming, heat sealing, and the like. After relatively short functional life, these items may be recovered in the form of waste, buried and finally be capable of being broken down biologically.

One of the disadvantages of employing the straight-chain 3-hydroxybutyric acid/3-hydroxyvaleric acid copolyester is that the copolyester has a lower ductility in comparison with those of polyethylenes and polypropylenes. This indicates that, when the straight-chain copolyester layer is employed as a sealant layer of packaging containers of heavy-duty or over-sized type, the copolyester layer is liable to be broken down due to the shortage of drop strength. Another disadvantage of the copolyester of this type is the low elasticity in the fused state. This indicates that, while the polyester in a thin film can be co-extrusion coated without developing pin holes on a paper substrate having a relatively smooth surface such as clay coated paper, the straight-chain copolyester develops pin holes or is liable to develop pin holes in heat sealing step when the copolyester as a thin film is co-extrusion coated on a substrate having a relatively rough surface, such as those of regenerated paper.

Now, it has been found that the aforesaid difficulties encountered with the use of copolyesters of this kind can be overcome by the use of a polymeric blend of a straight-chain 3-hydroxybutyric acid/3-hydroxyvaleric acid copolyester with a poly-ε-caprolactone which is also biodegradable. A composite laminate manufactured by use of the polymeric blend and a method for the manufacture thereof will be more particularly set forth by reference to the accompanying drawings (FIGS. 4 to 6) of an embodiment thereof.

Figure 4:
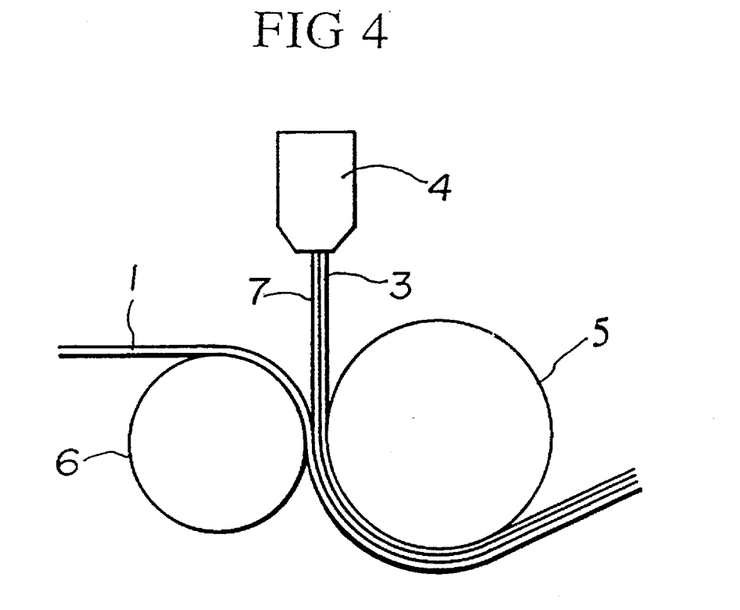
FIG. 4 is a section illustrating the co-extrusion method for the manufacture of a composite laminate according to the fourth aspect of the invention.
Figure 5:
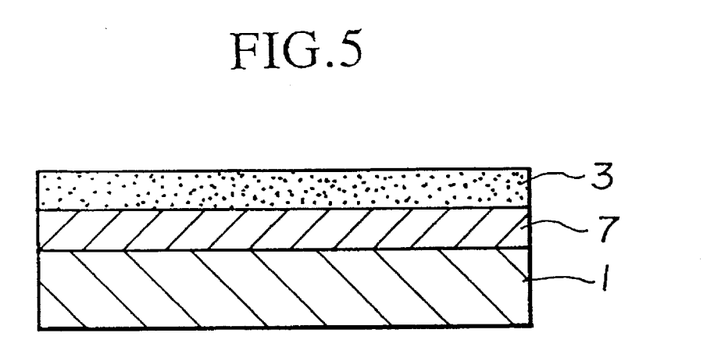
FIG. 5 is a sectional view showing a co-extrusion coated polyolefin/polymeric blend lamination film which has been laminated on a substrate.

As shown in FIG. 4, a polymeric blend 7 of a straight-chain 3-hydroxybutyric acid/3-hydroxyvaleric acid copolyeser with a poly-ε-caprolactone and a polyolefin 3 are co-extruded through T-die and co-extrusion coated by means of rolls 5, 6 so as to laminate the polymeric blend layer 7 on the surface of a sheet-like substrate 1 such as paper. The polymeric blend 7 and polyolefin 3 are co-extrusion coated on the surface of the substrate 1, as shown in FIG. 5.

Figure 6:
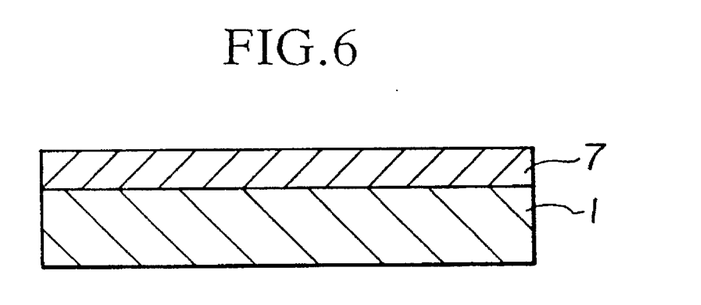
FIG. 6 is a sectional view showing a composite laminate according to the third aspect of the invention, obtained by stripping the polyolefin layer from the co-extrusion coated polyolefin/polymeric blend lamination film in FIG. 5.

The polyolefin 3 which adheres to the polymeric blend 7 by only pseudo-adhesion forces is thereafter stripped, thereby providing a composite laminate of the present invention, as shown in FIG. 6.

One of the greatest characteristics of the invention (FIGS. 4 to 6) is that a polymeric blend of a straight-chain 3-hydroxybutyric acid/3-hydroxyvaleric acid copolyester with a poly-ε-caprolactone is used as the thin sealant layer.

Although poly-ε-caprolactones are synthetic substances, they are biodegradable in their nature. They have a low melting point of about 60° C. and are very sticky at 50° C. or higher; therefore, they have not been heretofore used as a main building block for packaging materials.

Inversely, they have a high melt elasticity and a high elongation comparable with or higher than those of polyethylenes and polypropylenes.

A polymeric blend having a micro-dispersing phase can be obtained by blending a straight-chain 3-hydroxybutyric acid/3-hydroxyvaleric acid copolyester with a poly-ε-caprolactone in arbitrary proportions. The properties of the polymeric blend thus obtained depend on the blending ratio. When the amount of poly-ε-caprolactone is 10 parts by weight or less, based on 100 parts by weight of the straight-chain polyester, improving effects on elongation and melt-elasticity are insufficient. Inversely, when the amount of poly-ε-caprolactone is above 300 parts by weight, thermal resistance becomes poor.

Preferred blending ratio is 10 to 300 parts by weight of poly-ε-caprolactone, based on 100 parts by weight of the straight-chain polyester, preferably 15 to 200 parts by weight of the copolyester.

From viewpoint of co-extrusion processability, the preferred straight-chain 3-hydroxybutyric acid/3-hydroxyvaleric acid copolyester according to the present invention contains 1 to 20% by weight of 3-hydroxyvaleric acid moieties in the copolyester molecule.

Similarly, from the viewpoint of co-extrusion processability, the preferred poly-ε-caprolactones according to the invention have a melt flow rate of 0.1 to 3 g/10 min (80° C.).

In order to tackle the problems, which will be described afterward, associated with a difference between cooling conditions for solidifying individual ingredients of the polymeric blend, the polymeric blend is co-extruded with a polyolefin to laminate the polymeric blend in a thin film on a substrate. This is another characteristic of the present invention.

The solidification of the straight-chain copolyester is induced by crystallization. When the crystallization is insufficient, the solidified mass exhibits stickiness and no blocking resistance. The temperature for crystallization is preferably 60° to 70° C. When the temperature deviates from the range, crystallization proceeds much slowly.

As for poly-ε-caprolactone, the cooling temperature for solidification is 50° C. or lower, more preferably 40° C. or lower, because poly-ε-caprolactones have a melting point of about 60° C.

As described above, there is a clear difference between cooling conditions for solidifying individual ingredients of the polymeric blend; therefore, when the polymeric blend alone is extruded, blocking occurs due to the tackiness of either of these ingredient resins resulting in an operating trouble.

In order to overcome such difficulties, the polymeric blend of the present invention is co-extruded with a polyolefin so as to laminate the polymeric blend layer on a substrate, followed by winding, crystallizing the both ingredients, and then stripping the polyolefin layer to provide a finished composite laminate of the invention.

In addition, the co-extrusion of the polymeric blend with a polyolefin is favorable for forming a thin film of the polymeric blend with an uniform thickness; thus, the problems associated with so-called 'deckle edge' which develops in the peripheral parts of the extruded single-layered film of the polymeric blend with a thickness of 50 μm or less can also be overcome by means of the method of the invention.

The polyolefins employed in the present invention are generally selected from polyethylenes and polypropylenes from the viewpoint of processability and economic standpoint. A preferred melt flow rate of the polyolefin for attaining a stable processability in a thin film is 10 g/10 min or more, more preferably 15 to 50 g/10 min.

The substrate according to the present invention (FIGS. 4 to 6) is selected from the natural materials such as nonwoven rayon films, cellophane films as well as paper, paperboard and the like.

Stretched films of the straight-chain copolyester, or of a polymeric blend of the copolyester with a poly-ε-caprolactone may be also employed. These materials are biodegradable in nature.

The thickness and kinds of the substrate depend on the purpose.

In the method according to the present invention, a variety of substrates including those with a rough surface such as regenerated paper and paperboard may be coated without developing any pin holes.

A multi-layer T-die extrusion lamination machine is employed in the present invention (FIGS. 1 to 3); however, any multi-layer co-extrusion lamination techniques such as a multi-manifold co-extrusion, feed block technique, and the like may be employed.

The thickness ratio of the co-extruded polymeric blend layer is 1 to 50 μm according to the purpose. The thickness ratio of the polymeric blend to polyolefin layer is 100:50 or more. In this case, by taking advantage of the flow of the polyolefin, a polymeric blend with an uniform thickness in width direction can be obtained.

The co-extrusion temperature is 200° C. or lower, preferably 160° to 180° C. in consideration of the susceptibility of the straight-chain copolyester to thermal cracking.

The thicknesses of polymeric blend and polyolefin layer, and the co-extrusion temperature influence the heat-sealability of the polymeric blend to the substrate; therefore, the thicknesses and the co-extrusion temperature should fall respectively within the aforesaid ranges depending on the purpose. Laminating strength can be improved by treating the substrate with corona discharge. The temperature of cast rolls and nip rolls is maintained at 40° C. or lower, preferably 30° C. or lower, thereby cooling and solidifying the polyolefin layer and the poly-ε-caprolactone in the polymeric blend.

As noted above, co-extruded polymeric blend layer is laminated on the substrate, followed by stripping the polyolefin layer after crystallization of the polyester in the polymeric blend. An adequate interval between lamination and stripping is one hour or more at ambient temperature (25° C.). The stripped polyolefin may be recovered and recycled to reuse.

The composite laminates according to the present invention (FIGS. 1 to 3) are used for the manufacture of packaging bags, stock materials and containers such as trays, liquid cartons, paper cups, and the like by means of cutting, press forming, heat sealing, and the like. After relatively short functional life, these items may be recovered in the form of waste, buried and finally be capable of being broken down by biologically.

The following Examples will further illustrate the present invention, which by no means limit the invention.

EXAMPLE I

A straight-chain 3-hydroxybutyric acid/3-hydroxyvaleric acid copolyester, containing 10% by weight of 3-hydroxyvaleric acid moieties, in a thin film with a thickness of 5 μm and a polyethylene layer with a thickness of 20 μm and having a melt flow rate of 25 g/10 min were co-extruded by a multi-manifold co-extruder at a temperature of 190° C., and the co-extruded copolyester layer was laminated on a paperboard having a basis-weight of 350 g/m². After stripping the polyethylene layer, a composite laminate could be obtained with a good co-extrusion processability. The composite laminate thus obtained had a high laminating strength of 300 g/15 mm or more (peeling) and an excellent uniformity of thickness. In addition, trays could be readily formed from the composite laminate by means of press forming.

These trays were broken down biologically in about one month when buried in active sludge, and in three months when buried in the soil.

EXAMPLE II

A straight-chain 3-hydroxybutyric acid/3-hydroxyvaleric acid copolyester, containing 10% by weight of 3-hydroxyvaleric acid moieties, in a thin film with a thickness of 30 μm and polyethylene layer with a thickness of 30 μm and having a melt flow rate of 25 g/10 min were co-extruded by a multi-manifold co-extruder at a temperature of 190° C., and the co-extruded polyester layer was laminated on a paperboard having a basis-weight of 350 g/m². After stripping the polyethylene layer a composite laminate was obtained with a good co-extrusion processability. The composite laminate thus obtained had a high laminating strength of 300 g/15 mm or more (peeling) and an excellent uniformity of thickness. A 1-liter liquid carton formed from the composite laminate had a high heat-sealing strength of 15 kg/15 mm at a joint section.

The liquid carton was broken down in about two months when buried in active sludge and in five months when buried in the soil.

EXAMPLE III

A straight-chain 3-hydroxybutyric acid/3-hydroxyvaleric acid copolyester, containing 10% by weight of 3-hydroxyvaleric acid moieties, in a thin film with a thickness of 20 μm and polyethylene layer with a thickness of 20 μm and having a melt flow rate of 25 g/10 min were co-extruded by a multi-manifold co-extruder at a temperature of 190° C., and the co-extruded polyester layer was laminated on a nonwoven rayon fabric as substrate. After stripping the polyethylene layer, a composite laminate was obtained with a good co-extrusion processability. The composite laminate thus obtained had a high laminating strength of 350 g/15 mm (peeling) and an excellent uniformity of thickness.

A pouch having a heat-sealing strength of 1.0 kg/15 mm at a joint section could be formed from the composite laminate with a good processability.

The pouch was broken down in about two months when buried in active sludge and in six months when buried in the soil.

COMPARATIVE EXAMPLE I

A straight-chain 3-hydroxybutyric acid/3-hydroxyvaleric acid copolyester, containing 10% by weight of 3-hydroxyvaleric acid moieties, in a thin film with a thickness of 5 μm and a polyethylene layer with a thickness of 20 μm and having a melt flow rate of 5 g/10 min were co-extruded by a multi-manifold co-extrusion machine at a temperature of 190° C., and the co-extruded copolyester layer was laminated on a paperboard having a basis-weight of 350 g/m². After stripping the polyethylene layer, a composite laminate could be obtained. The uniformity of thickness of the composite laminate thus obtained was poor.

COMPARATIVE EXAMPLE II

A straight-chain 3-hydroxybutyric acid/3-hydroxyvaleric acid copolyester, containing 10% by weight of 3-hydroxyvaleric acid moieties, in a thin film with a thickness of 5 μm and a polyethylene layer with a thickness of 5 μm and having a melt flow rate of 25 g/10 min were co-extruded by a multi-manihold co-extrusion machine at a temperature of 190° C., and the co-extruded copolyester layer was laminated on a paperboard having a basis-weight of 350 g/m². After stripping the polyethylene layer, a composite laminate having an excellent uniformity of thickness could be obtained with a good processability, but the laminating strength was only 100 g/15 mm or lower.

COMPARATIVE EXAMPLE III

A straight-chain 3-hydroxybutyric acid/3-hydroxyvaleric acid copolyester, containing 10% by weight of 3-hydroxyvaleric acid moieties in the molecule, was extruded in a thin film with a thickness of 20 μm was extruded by a multi-manifold co-extruder at a temperature of 190° C., and the co-extruded film was laminated on a paperboard having a basis-weight of 350 g/m².

The uniformity of the thickness of the composite laminate thus obtained was poor. The laminating strength was only 100 g/15 mm or lower.

TABLE

|  | Example 1 | Comp. Example 1 | Comp. Example 2 | Comp. Example 3 | Example 2 | Example 3 |
|---|---|---|---|---|---|---|
| Co-extrusion Conditions | | | | | | |
| Extruder | Multi-manifold (2-resins 2 layers) co-extrusion laminater | | | | | |
| Substrate | Paperboard (Basis − wt. = 350 g/m²) | | | | | Nonwoven Rayon |
| Polyester | Straight-chain 3-hydroxybutyric acid/3-hydroxyvaleric (HV) acid copolyester (HV: 10%) | | | | | |
| Polyolefin | PE | PE | PE | None | PE | PE |
| (MFR) | (25) | (5) | (25) | | (25) | (25) |
| Thickness (μ): | | | | | | |
| Polyester | 5 | 5 | 5 | 20 | 30 | 20 |
| Polyolefin | 20 | 20 | 5 | — | 30 | 30 |
| Co-extruded film | 25 | 25 | 10 | 20 | 60 | 40 |
| Temp. (°C.) | 190 | 190 | 190 | 190 | 190 | 190 |
| Processability: | | | | | | |
| Co-extrusion | ◯ | X (poor) | ◯ | X (poor) | ◯ | ◯ |
| Uniformity of Thickness | | | | | | |
| Laminating Strength (g/15 mm) | (peeling) >300 | — | >100 | >100 | (peeling) >300 | 350 |
| Items formed | Trays | — | — | — | 1-liter Liq. carton | Pouch |
| Processability | good | | | | | |
| Heat Sealing Strength (kg/15 mm) | | | | | 1.5 | 1.0 |
| Biodegradability: | | | | | | |
| In active sludge (Months) | 1 | | | | 2 | 2 |
| In the soil | 3 | | | | 5 | 6 |

EXAMPLE IV

Poly-ε-caprolactone (50 parts by wt.) having a melt flow rate of 0.5 g/10 min (80° C.) was hot compounded in a twin screw extruder with a straight-chain 3-hydroxybutyric acid/3-hydroxyvaleric acid copolyester (100 parts by wt.) containing 15% by weight of 3-hydroxyvaleric acid moieties in the molecule. The polymeric blend and a polyethylene having a melt flow rate of 25 g/10 min are co-extruded at 170° C. by a multi-manifold co-extruder so as to obtain a co-extruded polyethylene/polymeric blend lamination film having a thickness of 10 μm for the polyethylene and 10 μm for the polymeric blend layer, and the co-extruded polymeric blend layer was laminated on the clay coated surface of a substrate made from a regenerated paper with a basis-weight of 300 g/m².

Thereafter, the polyethylene layer was stripped to thereby provide a composite laminate of the present invention. Similarly, a composite laminate having the polymeric blend layer on the nonclaycoated side of the substrate was obtained. Composite laminates thus obtained were uniform in thickness, and had no pin holes.

Trays could be formed by press forming with a good processability.

Trays thus obtained were capable of being broken down biologically when buried in active sludge in two months and in three months when buried in the soil.

COMPARATIVE EXAMPLE IV

The procedures of Example 4 were followed with the exception that a 3-hydroxybutyric acid/3-hydroxyvaleric acid copolyester containing 15% by weight of 3-hydroxyvaleric acid moieties in the molecule was used instead of the polymeric blend. In this case, either of the surfaces of paperboard was laminated.

It was observed that pin holes developed on the nonclay-coated side of the substrate.

EXAMPLE V

Poly-ε-caprolactone (50 parts by wt.) having a melt flow rate of 0.5 g/10 min (80° C.) was hot compounded in a two screw extruder with a straight-chain 3-hydroxybutyric acid/3-hydroxyvaleric acid copolyester containing 15% by weight of 3-hydroxyvaleric acid moieties.

The polymeric blend and a polyethylene having a melt flow rate of a 25 g/10 min are co-extruded at 170° C. by a multi-manifold co-extruder so as to obtain a co-extruded polyethylene/polymeric blend lamination film having a thickness of 30 μm for the polyethylene layer and 30 μm for the polymeric blend layer, and the co-extruded polymeric blend layer was laminated on a raw paper sheet suitable for the manufacture of liquid cartons having a basis-weight of 350 g/m². A composite laminate with an uniform thickness and no pin holes was obtained.

A 1-liter liquid carton was formed from the composite laminate thus obtained. The heat-sealing strength was 2.0 kg/15 mm at a joint section.

The liquid carton was filled up with hot water (80° C.). No deformation could be observed. Falling tests with a fall of 60 cm to a concrete ground by use of the liquid cartons (100 pieces) were carried out. No leakage of liquid was observed.

COMPARATIVE EXAMPLE V

The procedure of Example 5 was followed with the exception of that a 3-hydroxybutyric acid/3-hydroxyvaleric acid copolyester containing 15% by weight of 3-hydroxyvaleric acid moieties in the molecule was used in the place of the polymeric blend.

In falling tests, leakage of water was observed at a joint section in 92 pieces of the tested cartons (100 pieces).

COMPARATIVE EXAMPLE VI

The procedure of Example 5 was followed with the exception of that 5 parts by weight of poly-ε-caprolactone and 100 parts by weight of the straight-chain copolyester were hot compounded.

In falling tests, leakage was observed at joint section in 89 pieces of the tested cartons (100 pieces).

COMPARATIVE EXAMPLE VII

The procedure of Example 5 was followed with the exception of that 400 parts by weight of poly-ε-caprolactone and 100 parts by weight of the straight-chain copolyester were hot compounded. When the liquid carton formed from the composite was filled up with hot water (80° C.), swelling at a fuselage section was observed due to a poor thermal resistance.

As described above, according to the first and second aspects of the invention, there is provided a biodegradable composite laminate having a sufficient laminating strength, the composite laminate comprising a substrate made mainly from a natural material and a straight-chain, biodegradable 3-hydroxybutyric acid/3-hydroxyvaleric acid copolyester layer in a thin film with a thickness of 50 μm or less, the polyester layer being laminated on the substrate. The composite laminates thus obtained are useful for the manufacture of stock materials and packaging containers.

When items formed from composite laminates according to the present invention (FIGS. 1 to 3) are buried or composed with other garbage, these items were capable of being broken down biologically.

In addition, according to the third and fourth aspect of the invention (FIGS. 4 to 6), there is provided a biodegradable composite laminate comprising a substrate made mainly from a natural material such as paper or paperboard, and a polymeric blend layer of poly-ε-caprolactone with a biodegradable, straight-chain 3-hydroxybutyric acid/3-hydroxyvaleric acid copolyester, the polymeric blend being laminated on the substrate in an uniform and thin film with a thickness of 50 μm or less. The polymeric blend can be coated and laminated on the substrate without developing pin holes, regardless of the relatively rough surface of the substrate.

The composite laminates thus obtained are useful for the manufacture of large-sized and heavy-duty type stock materials and containers.

When items formed from the composites according to the invention (FIGS. 4 to 6) are buried or composed with other garbage, they are capable of being broken down biologically.

What is claimed is:

1. A method for the manufacture of a composite laminate, said method comprising the steps of:
   (a) co-extrusion coating a straight-chain, biodegradable 3-hydroxybutyric acid/3-hydroxyvaleric acid copolyester thin film and a polyolefin on at least one surface of a sheet-like substrate, the copolyester thin film/polyolefin being coated on the substrate with the copolyester thin film facing the substrate; and
   (b) stripping the polyolefin layer from the copolyester thin film after step (a).

2. A method according to claim 1, wherein said copolyester thin film has a thickness in the range of 1 to 50 μm.

3. A method according to claim 1, wherein said polyolefin has a mass flow rate of at least 1 g/min.

4. A method according to claim 1, wherein said polyolefin has a mass flow rate in the range of 15 g/10 min to 50 g/10 min.

5. A method according to claim 1, wherein the thickness ratio of the copolyester thin film to the polyolefin is at least 2:1.

6. A method according to claim 1, wherein the thickness ratio of the copolyester thin film to the polyolefin is at least 1:1.

7. A method according to claim 1, wherein said polyolefin is selected from the group consisting of polyethylenes and polypropylenes.

8. A method for the manufacture of a composite laminate, said method comprising the steps of:
   (a) co-extrusion coating a thin film polymeric blend of 100 parts by weight of a straight-chain 3-hydroxybutyric acid/3-hydroxyvaleric acid copolyester with 10 to 300 parts by weight of poly-ε-caprolactone, and a polyolefin on at least one surface of a sheet-like substrate, the thin film polymeric blend/polyolefin being coated on the substrate with the polymeric blend facing the substrate; and
   (b) stripping the polyolefin layer from the thin film polymeric blend after step (a).

9. A method according to claim 8, wherein said thin film polymeric blend has a thickness in the range of 1 to 50 μm.

10. A method according to claim 8, wherein said polyolefin has a mass flow rate of at least 1 g/min.

11. A method according to claim 8, wherein said polyolefin has a mass flow rate in the range of 15 g/10 min to 50 g/10 min.

12. A method according to claim 8, wherein the thickness ratio of the thin film polymeric blend to the polyolefin is at least 2:1.

13. A method according to claim 8, wherein the thickness ratio of the thin film polymeric blend to the polyolefin is at least 1:1.

14. A method according to claim 8, wherein said polyolefin is selected from the group consisting of polyethylenes and polypropylenes.

* * * * *

UNITED STATES PATENT AND TRADEMARK OFFICE
CERTIFICATE OF CORRECTION

PATENT NO. : 5,498,385
DATED : March 12, 1996
INVENTOR(S) : Kazuya YABUSA et al.

It is certified that error appears in the above-indentified patent and that said Letters Patent is hereby corrected as shown below:

Cols. 9 and 10, in the Table, change ">100" (both occurrences) to --<100--.

Signed and Sealed this

Ninth Day of July, 1996

Attest:

BRUCE LEHMAN

Attesting Officer

Commissioner of Patents and Trademarks